(12) United States Patent
Aoki

(10) Patent No.: US 8,504,232 B2
(45) Date of Patent: Aug. 6, 2013

(54) ELECTRICALLY POWERED VEHICLE AND METHOD FOR CONTROLLING THE SAME

(75) Inventor: Takanori Aoki, Nisshin (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 13/502,006

(22) PCT Filed: Feb. 15, 2011

(86) PCT No.: PCT/JP2011/053120
§ 371 (c)(1),
(2), (4) Date: Apr. 13, 2012

(87) PCT Pub. No.: WO2012/111087
PCT Pub. Date: Aug. 23, 2012

(65) Prior Publication Data
US 2012/0232736 A1 Sep. 13, 2012

(51) Int. Cl.
*H02J 7/00* (2006.01)
(52) U.S. Cl.
USPC .......................................... 701/22; 180/65.29
(58) Field of Classification Search
USPC .......................................... 701/22; 180/65.29
See application file for complete search history.

(56) References Cited

U.S. PATENT DOCUMENTS

| | | |
|---|---|---|
| 2003/0231005 A1 | 12/2003 | Kohama et al. |
| 2009/0315519 A1* | 12/2009 | Izumi et al. .................. 320/134 |

FOREIGN PATENT DOCUMENTS

| | | |
|---|---|---|
| JP | 09-098510 A | 4/1997 |
| JP | 10-164761 A | 6/1998 |
| JP | 2003-272712 A | 9/2003 |
| JP | 2004-003460 A | 1/2004 |
| JP | 2007-269093 A | 10/2007 |
| JP | 2010-125926 A | 6/2010 |

OTHER PUBLICATIONS

International Search Report mailed Apr. 12, 2011 of PCT/JP2011/053120.

* cited by examiner

*Primary Examiner* — Mary Cheung
*Assistant Examiner* — Yuen Wong
(74) *Attorney, Agent, or Firm* — Kenyon & Kenyon LLP

(57) ABSTRACT

A charging state estimation unit estimates a remaining capacity of a power storage device. A charge/discharge control unit controls charging and discharging of the power storage device based on the remaining capacity estimate value. The charge/discharge control unit includes a charge instruction unit for, in the case where the remaining capacity estimate value falls below a predetermined lower limit value, controlling the internal combustion engine to be in the load operation state to generate charge power and controlling the internal combustion engine to be in the no-load operation state when it is determined that a prescribed charge termination condition is satisfied. The charge instruction unit sets the charge termination condition such that the charging time for the power storage device is shortened as the charge power that can be received by the power storage device in the present state is decreased.

15 Claims, 14 Drawing Sheets

ELECTRICALLY POWERED VEHICLE AND METHOD FOR CONTROLLING THE SAME

This is a 371 national phase application of PCT/JP2011/053120 filed 15 Feb. 2011, the contents of which are incorporated herein by reference.

TECHNICAL FIELD

The present invention relates to an electrically powered vehicle and a method of controlling the electrically powered vehicle, and more particularly to charging control for a vehicle-mounted power storage device in the electrically powered vehicle provided with a mechanism using an output of an internal combustion engine to charge the vehicle-mounted power storage device.

BACKGROUND ART

Conventionally, in an electrically powered vehicle capable of generating vehicle driving force with the electric power from a vehicle-mounted power storage device, a power generation mechanism using an output from an internal combustion engine to generate charge power for the vehicle-mounted power storage device is provided. As an example of this type of electrically powered vehicle, Japanese Patent Laying-Open No. 2004-003460 (Patent Literature 1) discloses a hybrid vehicle provided with an economy running system which serves to temporarily stop the engine while the vehicle is being stopped in accordance with a predetermined condition.

According to Patent Literature 1, when the temperature of a secondary battery (battery) which is a vehicle-mounted power storage device is higher than a predetermined temperature, or when the charging amount of the battery is less than a predetermined charging amount, even if the vehicle is stopped, a temporary stop of the engine is inhibited to prevent the engine from stopping. When the temperature of the battery is higher than the predetermined temperature, a charging voltages value or a charging current value is adjusted so as to suppress charging of the battery. Accordingly, the charging amount which does not inhibit a temporary stop is maintained while suppressing an excessive increase in the temperature of the battery by generation of the heat of reaction resulting from the chemical reaction within the battery due to charging and by generation of Joule heat resulting from an internal resistance of the battery.

CITATION LIST

Patent Literature
PTL 1: Japanese Patent Laying-Open No. 2004-003460
PTL 2: Japanese Patent Laying-Open No. 2003-272712
PTL 3: Japanese Patent Laying-Open No. 09-098510

SUMMARY OF INVENTION

Technical Problem

In Patent Literature 1, when the temperature of the battery is relatively high, the charge power to the battery is limited so as to suppress an excessive increase in the temperature of the battery due to charging. In this way, it is intended that inhibition of the temporary stop of the engine be prevented as far as possible.

It is known that the performance of the secondary battery typically used as a vehicle-mounted power storage device has temperature dependency. The secondary battery particularly has temperature dependency by which the internal resistance rises at the time of low temperature. Accordingly, it is required to limit the charge power for the vehicle-mounted power storage device not only at the time of high temperature but also at the time of low temperature.

In addition, in the case where the charge power for the vehicle-mounted power storage device is limited when the temperature of the vehicle-mounted power storage device is low, the charging of the vehicle-mounted power storage device may hardly progress even if the engine is operated in order to charge the vehicle-mounted power storage device. In such a situation, it becomes necessary to continuously operate the engine for a long period of time until the charged amount of the vehicle-mounted power storage device reaches a predetermined charging amount. This may cause a decrease in energy efficiency (fuel efficiency). Furthermore, due to the continuous operation of the engine for a long period of time, the driving sound of the engine is to be perceived as noise by the driver while the hybrid vehicle is being stopped. This may cause the driver discomfort.

Accordingly, the present invention has been made to solve the above-described problems. An object of the present invention is to suppress a decrease in energy efficiency in the case where the charge power that can be received by a vehicle-mounted power storage device is limited in the electrically powered vehicle using an output of an internal combustion engine to generate charge power for the vehicle-mounted power storage device.

Solution to Problem

According to an aspect of the present invention, an electrically powered vehicle includes a power storage device storing electric power for generating driving force for a vehicle; an internal combustion engine; a power generation mechanism for generating charge power for the power storage device by electric power generation using an output of the internal combustion engine; a charging state estimation unit for estimating a remaining capacity of the power storage device based on a state value of the power storage device; a charge/discharge control unit for controlling charging and discharging of the power storage device based on a remaining capacity estimate value obtained by the charging state estimation unit. The charge/discharge control unit includes a charge instruction unit for, in a case where the remaining capacity estimate value falls below a predetermined lower limit value, controlling the internal combustion engine to be in a load operation state to generate the charge power and controlling the internal combustion engine to be in a no-load operation state or in a stopped state when it is determined that a prescribed charge termination condition is satisfied. The charge instruction unit sets the charge termination condition such that a charging time for the power storage device is shortened as the charge power that can be received by the power storage device in a present state is decreased.

Preferably, the charge instruction unit determines that the charge termination condition is satisfied when the remaining capacity estimate value reaches a charge termination threshold value. The charge termination threshold value is set at a value that decreases as the charge power that can be received by the power storage device in the present state is decreased.

Preferably, the electrically powered vehicle further includes an upper limit value setting unit for setting a charge power upper limit value of the power storage device in the present state at least based on the remaining capacity estimate value and a temperature of the power storage device. The charge termination threshold value is set at a value that decreases as the charge power upper limit value is decreased.

Preferably, the power storage device has a characteristic that the charge power upper limit value is decreased as the temperature of the power storage device is lowered. The charge instruction unit decreases the charge termination threshold value from a first value to a second value when a first condition is satisfied that the temperature of the power storage device is lower than a prescribed temperature.

Preferably, the charge instruction unit decreases the charge termination threshold value from the first value to the second value when a vehicle speed of the electrically powered vehicle is lower than a prescribed speed in a case where the first condition is satisfied.

Preferably, the charge instruction unit determines that the charge termination condition is satisfied when a prescribed time has elapsed since start of charging of the power storage device. The prescribed time is set at a value that decreases as a charge power upper limit value of the power storage device in the present state is decreased.

Preferably, the power storage device has a characteristic that the charge power upper limit value is decreased as a temperature of the power storage device is lowered. The charge instruction unit decreases the prescribed time from a first value to a second value when a first condition is satisfied that the temperature of the power storage device is lower than a prescribed temperature.

Preferably, the charge instruction unit decreases the prescribed time from the first value to the second value when a vehicle speed of the electrically powered vehicle is lower than a prescribed speed in a case where the first condition is satisfied.

Preferably, when it is determined that a predetermined intermittent operation permission condition for permitting an intermittent operation of the internal combustion engine is not satisfied, the charge instruction unit changes the charge termination condition such that the charging time for the power storage device is shortened as compared with a case where the intermittent operation permission condition is satisfied.

Preferably, the charge instruction unit determines that the charge termination condition is satisfied when the remaining capacity estimate value reaches a charge termination threshold value. The power storage device has a characteristic that a charge power upper limit value is decreased as a temperature of the power storage device is lowered. In a case where a first condition is satisfied that the temperature of the power storage device is lower than a prescribed temperature, the charge instruction unit decreases the charge termination threshold value from a first value to a second value when the intermittent operation permission condition is satisfied, and decreases the charge termination threshold value from the first value to a third value which is smaller than the second value when the intermittent operation permission condition is not satisfied.

Preferably, the charge instruction unit determines that the intermittent operation permission condition is satisfied at least based on a fact that a discharge power upper limit value of the power storage device in the present state is equal to or greater than consumption electric power required for starting the internal combustion engine in the stopped state.

Preferably, the power generation mechanism includes a first electric motor configured to generate charge power by electric power generation using the output of the internal combustion engine. The electrically powered vehicle further includes a second electric motor configured to be capable of receiving the electric power from the power storage device to output motive power to a drive shaft, and a power split device for dividing the motive power of the internal combustion engine into the drive shaft and a rotation shaft of the first electric motor.

Preferably, the power generation mechanism includes a power generator configured to generate charge power by electric power generation using the output of the internal combustion engine. The electrically powered vehicle further includes an electric motor configured to receive the electric power from the power storage device to generate driving force for the vehicle.

Preferably, the electrically powered vehicle further includes a motor generator configured to receive the electric power from the power storage device to generate the driving force for the vehicle. The motor generator operates as a power generator using the output of the internal combustion engine to generate electric power in a state where the driving force for the vehicle is not generated, to thereby implement the power generation mechanism.

In another aspect of the present invention, a method of controlling an electrically powered vehicle is provided. The electrically powered vehicle includes a power storage device storing electric power for generating driving force for a vehicle, an internal combustion engine, and a power generation mechanism for generating charge power for the power storage device by electric power generation using an output of the internal combustion engine. The controlling method includes the steps of estimating a remaining capacity of the power storage device based on a state value of the power storage device, and controlling charging and discharging of the power storage device based on a remaining capacity estimate value obtained by the estimating step. The controlling step includes the steps of, in a case where the remaining capacity estimate value falls below a predetermined lower limit value, controlling the internal combustion engine to be in a load operation state to generate the charge power, and controlling the internal combustion engine to be in a no-load operation state or in a stopped state when it is determined that a prescribed charge termination condition is satisfied; and setting the charge termination condition such that a charging time for the power storage device is shortened as a charge power upper limit value that can be received by the power storage device in a present state is decreased.

Advantageous Effects of Invention

According to the present invention, in the electrically powered vehicle which uses an output of an internal combustion engine to generate charge power for a vehicle-mounted power storage device, it becomes possible to suppress a decrease in energy efficiency in the case where the charge power that can be received by the vehicle-mounted power storage device is limited.

DESCRIPTION OF EMBODIMENTS

Figure 1:
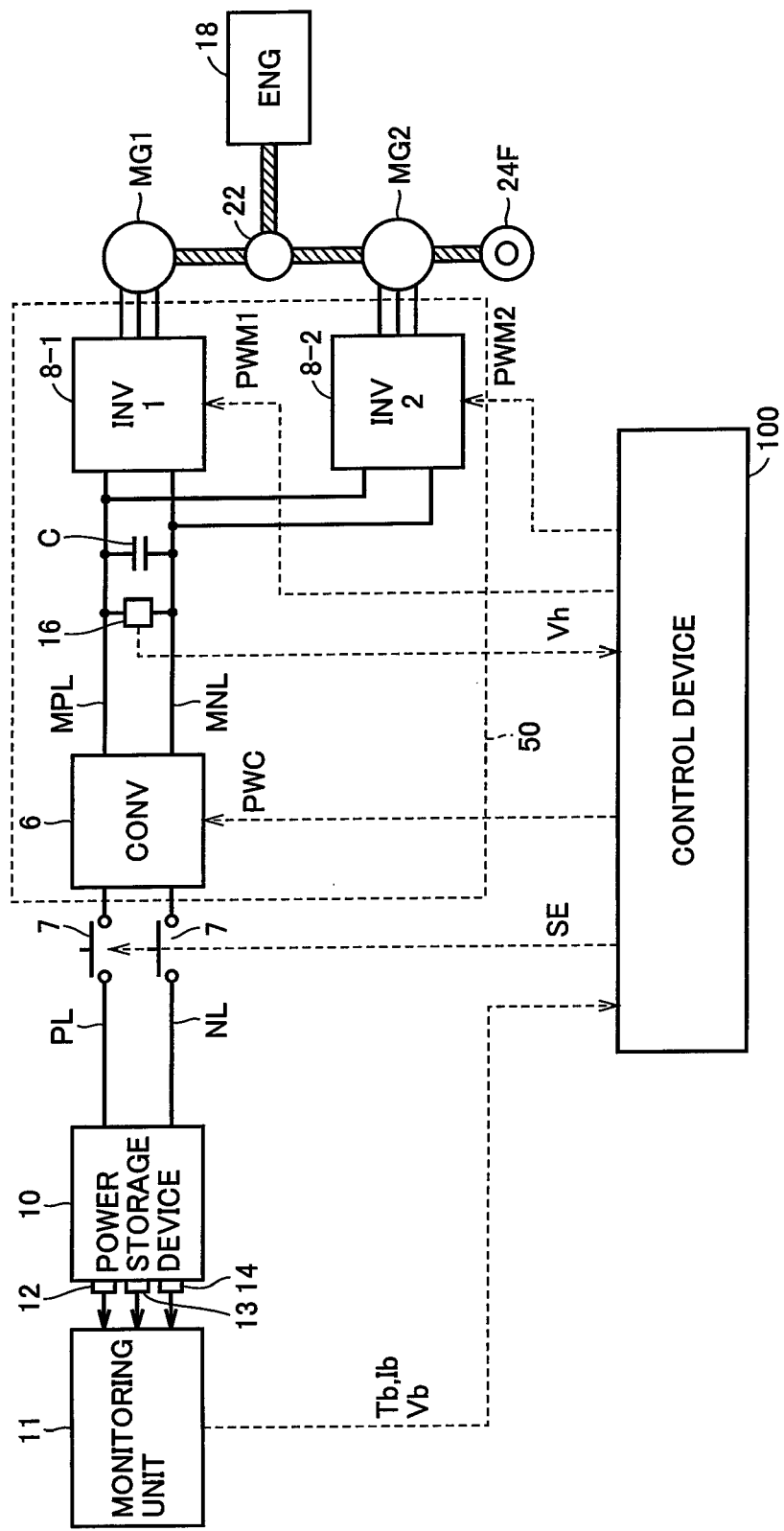
FIG. 1 is a schematic configuration diagram of a hybrid vehicle shown as a representative example of an electrically powered vehicle according to the first embodiment of the present invention.

Embodiments of the present invention will be hereinafter described in detail with reference to the accompanying drawings, in which the same or corresponding components are designated by the same reference characters.

[First Embodiment]

FIG. 1 is a schematic configuration diagram of a hybrid vehicle 5 shown as a representative example of an electrically powered vehicle according to the first embodiment of the present invention.

Referring to FIG. 1, hybrid vehicle 5 is equipped with an engine (internal combustion engine) 18, and motor generators MG1 and MG2. Furthermore, hybrid vehicle 5 is equipped with a power storage device 10 that can input and output electric power to and from motor generators MG1 and MG2.

Power storage device 10 is a re-dischargeable power storage element, for which a lithium-ion secondary battery or a nickel-metal hydride secondary battery is typically applied. Alternatively, power storage device 10 may be configured from a power storage element other than a battery such as an electric double layer capacitor. FIG. 1 shows a system configuration related to charge/discharge control for power storage device 10 included in hybrid vehicles 5.

A monitoring unit 11 detects a "state value" of power storage device 10 based on the outputs of a temperature sensor 12, a voltage sensor 13 and a current sensor 14 provided in power storage device 10. In other words, the "state value" includes at least a temperature Tb of power storage device 10, and further includes a voltage Vb and/or a current Ib of power storage device 10 if necessary. As described above, since a secondary battery is typically used as power storage device 10, temperature Tb, voltage Vb and current Ib of power storage device 10 will be hereinafter also referred to as a battery temperature Tb, a battery voltage Vb and a battery current Ib, respectively. Furthermore, battery temperature Tb, battery voltage Vb and battery current Ib will also be collectively referred to as "battery data".

In addition, temperature sensor 12, voltage sensor 13 and current sensor 14 collectively indicate a temperature sensor, a voltage sensor and a current sensor, respectively, provided in power storage device 10. In other words, for confirmatory description, it is general that at least one of temperature sensor 12, voltage sensor 13 and current sensor 14 is practically provided in plural numbers.

Engine 18 and motor generators MG1 and MG2 are mechanically coupled via a power split device 22.

Figure 2:
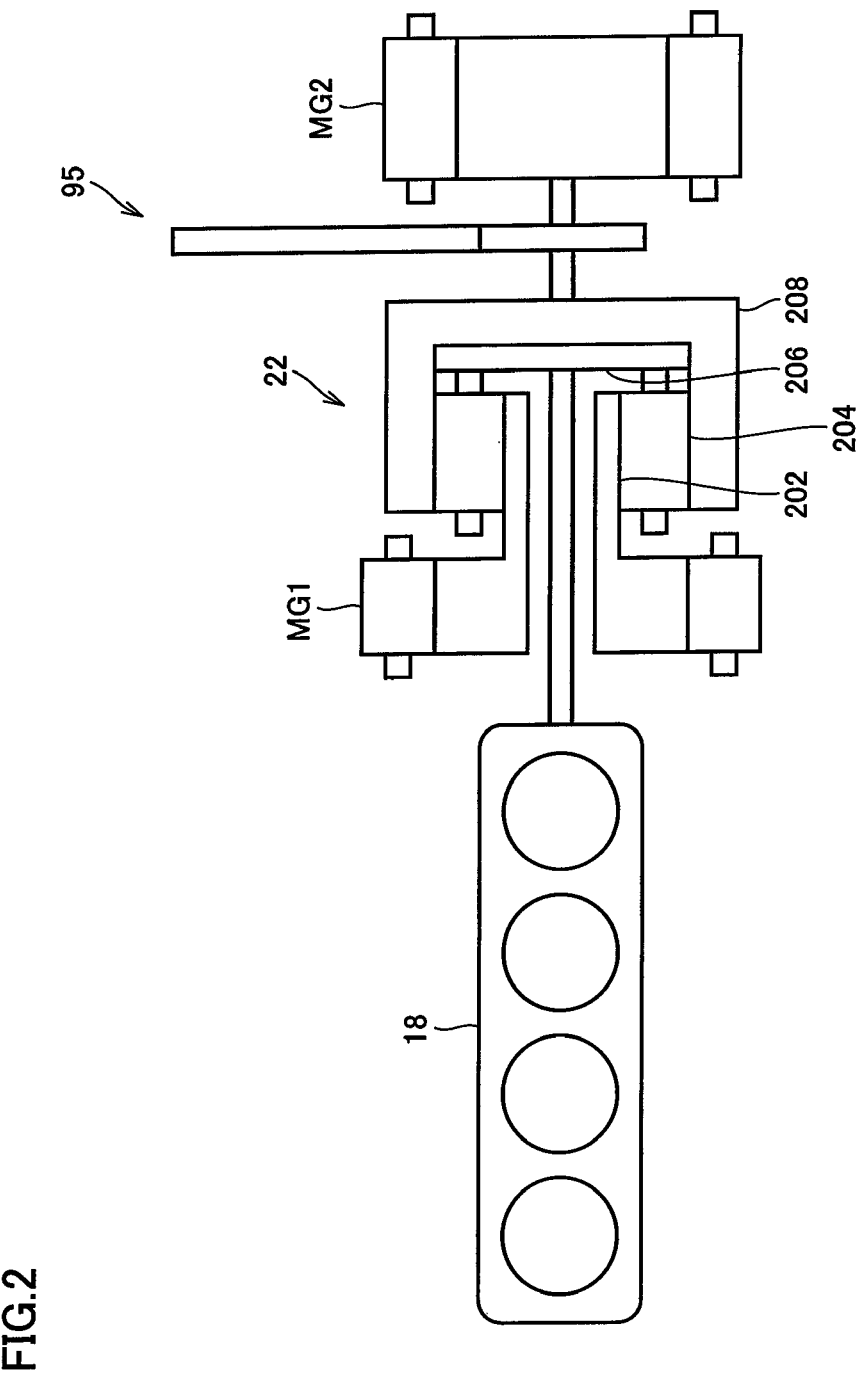
FIG. 2 is a configuration diagram of a power split device shown in FIG. 1.

Referring to FIG. 2, power split device 22 will be further described. Power split device 22 is formed of a planetary gear including a sun gear 202, a pinion gear 204, a carrier 206, and a ring gear 208.

Pinion gear 204 engages with sun gear 202 and ring gear 208. Carrier 206 supports pinion gear 204 in a rotatable manner. Sun gear 202 is coupled to the rotation shaft of motor generator MG1. Carrier 206 is coupled to the crankshaft of engine 18. Ring gear 208 is coupled to the rotation shaft of motor generator MG2 and a reduction gear 95.

Figure 3:
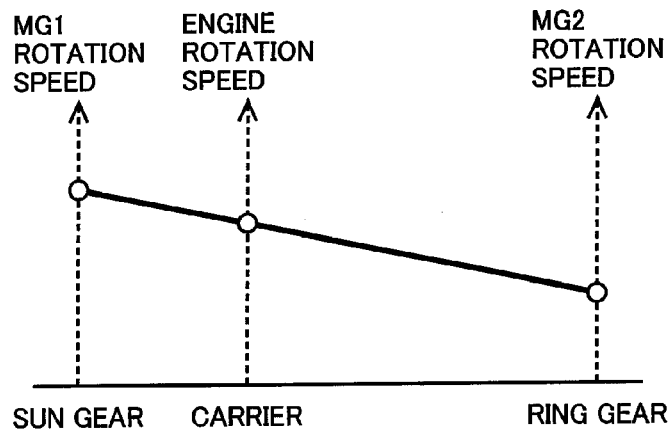
FIG. 3 is a collinear diagram of the power split device.

Engine 18 and motor generators MG1 and MG2 are coupled via power split device 22 consisting of a planetary gear, which establishes a relationship in which the rotation speeds of engine 18, motor generator MG1 and motor generator MG2 are connected with a straight line in a collinear diagram, as shown in FIG. 3.

Consequently, during running of hybrid vehicle 5, power split device 22 divides the driving force generated by operation of engine 18 into two driving forces, one of which is distributed to motor generator MG1 and the other of which is distributed to motor generator MG2. The driving force distributed from power split device 22 to motor generator MG1 is used for the operation of generating electric power. On the other hand, the driving force distributed to motor generator MG2 is combined with the driving force generated in motor generator MG2, which is then used to drive a driving wheel 24F.

In this way, in accordance with the running condition of hybrid vehicle 5, the driving force is distributed and combined among the above-described three elements through power split device 22, with the result that driving wheel 24F is driven. Furthermore, during running of hybrid vehicle 5, power storage device 10 can be charged with the electric power generated by motor generator MG1 which is powered by the output of engine 18. In other words, engine 18 corresponds to an "internal combustion engine", and motor generator MG2 corresponds to the "second electric motor". Furthermore, motor generator MG1 corresponds to a "power generation mechanism" and the "first electric motor".

Referring back to FIG. 1, hybrid vehicle 5 further includes a power control unit 50. Power control unit 50 is configured to perform power conversion bi-directionally between power storage device 10 and each of motor generators MG1 and MG2. Power control unit 50 includes a converter (CONV) 6, and a first inverter (INV1) 8-1 and a second inverter (INV2) 8-2 associated with motor generators MG1 and MG2, respectively.

Converter (CONV) 6 is configured to perform direct-current (DC) voltage conversion bi-directionally between power storage device 10 and a positive bus MPL for transmitting a DC link voltage of inverters 8-1 and 8-2. In other words, the input/output voltage of power storage device 10 and the DC voltage between positive bus MPL and a negative bus MNL are bi-directionally raised or lowered. The operation for raising and lowering the voltage in converter 6 is controlled in accordance with a switching command PWC from a control device 100. Furthermore, a smoothing capacitor C is connected between positive bus MPL and negative bus MNL. Also, a voltage sensor 16 detects a DC voltage Vh between positive bus MPL and negative bus MNL.

First inverter 8-1 and second inverter 8-2 perform power conversion bi-directionally between the DC power on positive bus MPL and negative bus MNL, and the alternating-current (AC) power input to and output from motor generators MG1 and MG2. In response to a switching command PWM1 from control device 100, first inverter 8-1 mainly converts the AC power generated by motor generator MG1 using the output from engine 18 into a DC power, and supplies the DC power to positive bus MPL and negative bus MNL. Accordingly, power storage device 10 can be actively charged by the output of engine 18 also during vehicle running.

Furthermore, at the time of startup of engine 18, in response to switching command PWM1 from control device 100, first inverter 8-1 converts the DC power from power storage device 10 into an AC power, and supplies the AC power to motor generator MG1. This allows engine 18 to start motor generator MG1 as a starter.

In response to a switching command PWM2 from control device 100, second inverter 8-2 converts the DC power supplied through positive bus MPL and negative bus MNL into an AC power, and supplies the AC power to motor generator MG2. Accordingly, motor generator MG2 generates driving force for hybrid vehicle 5.

In contrast, during regenerative braking of hybrid vehicle 5, motor generator MG2 generates AC power in accordance with deceleration of driving wheel 24F. In this case, in response to switching command PWM2 from control device 100, second inverter 8-2 converts the AC power generated by motor generator MG2 into a DC power, and supplies the DC power to positive bus MPL and negative bus MNL. Accordingly, power storage device 10 is charged during deceleration and during running on a downhill.

A system main relay 7 which is interposed in the middle of a positive line PL and a negative line NL and connected thereto is provided between power storage device 10 and power control unit 50. In response to a relay control signal SE from control device 100, system main relay 7 is turned on or off. System main relay 7 is used as a representative example of a switching device capable of interrupting the charge/discharge path of power storage device 10. In other words, any type of switching device can be applied in place of system main relay 7.

Control device 100 is typically configured by an electronic control unit (ECU) that consists mainly of a CPU (Central Processing Unit), a memory region such as a RAM (Random Access Memory) and a ROM (Read Only Memory), and an input/output interface. By the CPU reading the program stored in advance in the ROM and the like onto the RAM and executing the program, control device 100 performs control related to vehicle running and charging/discharging. It is to be noted that at least a part of the ECU may be configured to perform a prescribed numerical/logical operation processing by hardware such as an electronic circuit.

As the information input into control device 100, FIG. 1 illustrates battery data from monitoring unit 11 (battery temperature Tb, battery voltage Vb and battery current Ib) and a DC voltage Vh from voltage sensor 16 disposed between positive bus MPL and negative bus MNL. Although not shown, control device 100 also receives the current detection value of each phase of each of motor generators MG1 and MG2, and the rotation angle detection value of each of motor generators MG1 and MG2.

Figure 4:
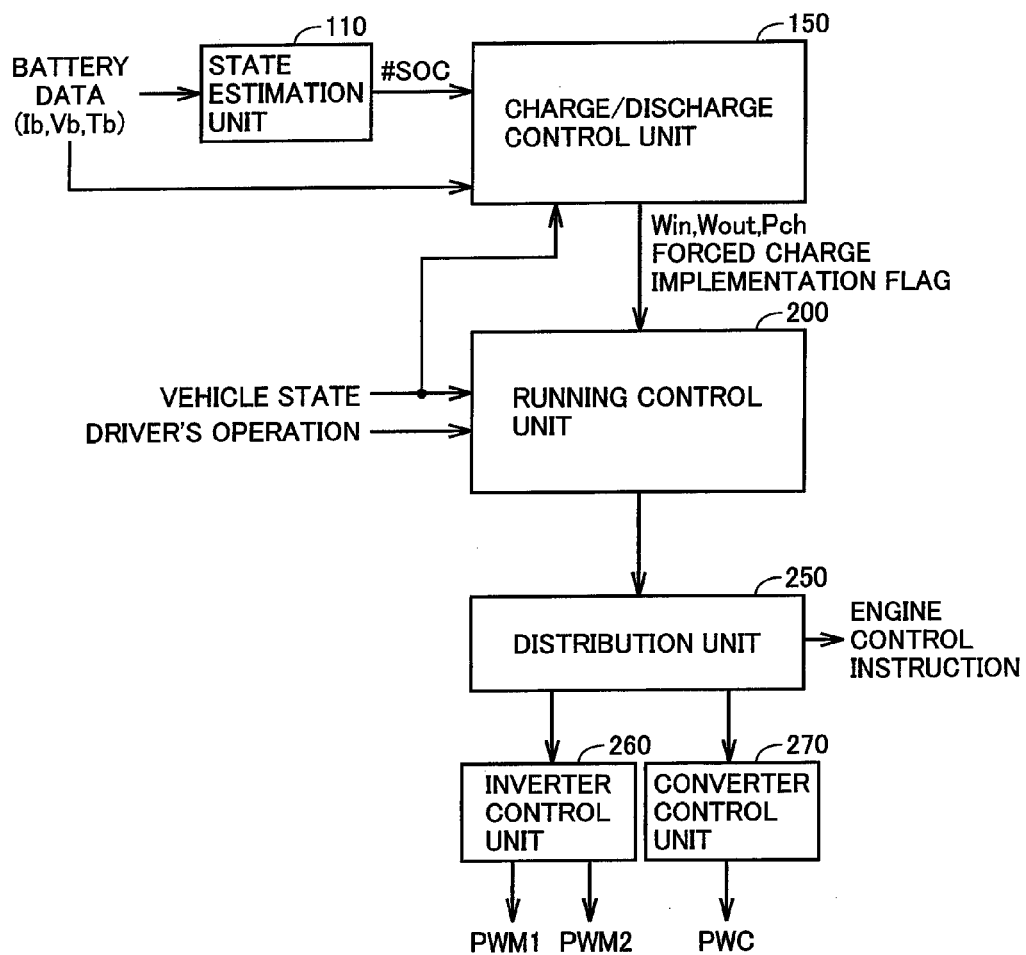
FIG. 4 is a functional block diagram illustrating the charge/discharge control for a vehicle-mounted power storage device in the electrically powered vehicle according to the first embodiment of the present invention.

FIG. 4 is a functional block diagram illustrating charge/discharge control for a vehicle-mounted power storage device in the electrically powered vehicle according to the first embodiment of the present invention. Each functional block described in each block diagram starting with FIG. 4 and described below can be implemented by control device 100 executing software processing in accordance with the program set in advance. Alternatively, a circuit (hardware) having a function corresponding to this functional block can be configured within control device 100.

Referring to FIG. 4, a state estimation unit 110 estimates the SOC of power storage device 10 based on the battery data (Ib, Vb, Tb) from monitoring unit 11. The SOC shows the present remaining capacity with respect to the fully charged capacity on a percentage basis (0 to 100%). For example, state estimation unit 110 sequentially computes the SOC estimate value (#SOC) of power storage device 10 based on the integrated value of the charging/discharging amount of power storage device 10. The integrated value of the charging/discharging amount is obtained by integrating the product (electric power) of battery current Ib and battery voltage Vb with respect to time. Alternatively, the SOC estimate value (#SOC) may be calculated based on the relationship between an open circuit voltage (OCV) and the SOC.

The SOC estimate value (#SOC) obtained by state estimation unit 110 is transmitted to a charge/discharge control unit 150.

Charge/discharge control unit 150 sets a charge power upper limit value Win and a discharge power upper limit value Wout based on the state of power storage device 10. Furthermore, charge/discharge control unit 150 determines whether power storage device 10 needs to be charged or not and sets a charge power command value Pch for power storage device 10. When power storage device 10 does not need to be charged, charge power command value Pch is set such that Pch=0. When it is determined that power storage device 10 needs to be charged, charge power command value Pch is set such that Pch>0.

Furthermore, when the SOC estimate value (#SOC) of power storage device 10 falls below a predetermined lower limit value, charge/discharge control unit 150 turns on a forced charge implementation flag for forcibly charging power storage device 10. This forced charge implementation flag is set to be OFF in the initial state, but is set to be ON when power storage device 10 needs to be forcibly charged. Furthermore, when the SOC estimate value (#SOC) of power storage device 10 reaches a predetermined forced charge termination threshold value by performing forced charging, the forced charge implementation flag is set to be OFF in order to terminate the forced charging of power storage device 10.

A running control unit 200 calculates the vehicle driving force and the vehicle braking force required for the entire hybrid vehicle 5 in accordance with the vehicle state of hybrid vehicle 5 and the driver's operation. The driver's operation includes the stepping amount of an accelerator pedal (not shown), the position of a shift lever (not shown), the stepping amount of a brake pedal (not shown), and the like.

Running control unit 200 determines the output request to each of motor generators MG1 and MG2, and the output request to engine 18 such that the requested vehicle driving force or vehicle braking force may be implemented. Hybrid vehicle 5 can be driven only with the output of motor generator MG2 while engine 18 remains stopped. Therefore, the energy efficiency can be improved by determining each output request such that engine 18 is operated in the region other than that showing poor fuel efficiency. Furthermore, the output request to motor generators MG1 and MG2 is set under the limitations imposed such that power storage device 10 is charged and discharged within a power range (Win to Wout) in which power storage device 10 can be charged and discharged. In other words, when the output power of power storage device 10 cannot be ensured, the output by motor generator MG2 is limited.

A distribution unit 250 calculates the torque and the rotation speed of each of motor generators MG1 and MG2 in accordance with the output request to each of motor generators MG1 and MG2 that is set by running control unit 200. Then, distribution unit 250 outputs the control command regarding the torque and the rotational speed to an inverter control unit 260 and also outputs the control command value of DC voltage Vh to a converter control unit 270.

Distribution unit 250 also generates an engine control instruction showing the engine power and the engine target rotation speed which are determined by running control unit 200. In accordance with the engine control instruction, fuel injection, ignition timing, valve timing and the like of engine 18 which is not shown are controlled.

In response to the control command from distribution unit 250, inverter control unit 260 generates switching commands PWM1 and PWM2 for driving motor generators MG1 and MG2. These switching commands PWM1 and PWM2 are output to inverters 8-1 and 8-2, respectively.

Converter control unit 270 generates switching command PWC such that DC voltage Vh is controlled in accordance with the control command from distribution unit 250. The charge/discharge power for power storage device 10 is to be controlled by this voltage conversion of converter 6 in accordance with switching command PWC.

In this way, running of hybrid vehicle 5 is controlled with improved energy efficiency in accordance with the vehicle state and the driver's operation.

Figure 5:
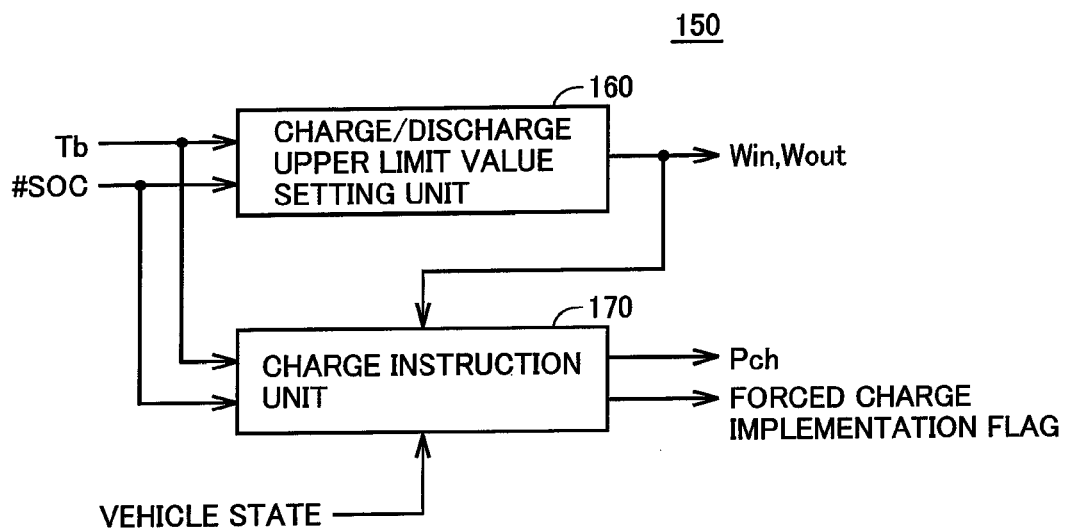
FIG. 5 is a functional block diagram further illustrating the configuration of a charge/discharge control unit shown in FIG. 4.

FIG. 5 shows the configuration of charge/discharge control unit 150 (FIG. 4) in greater detail.

Referring to FIG. 5, charge/discharge control unit 150 includes a charge/discharge upper limit value setting unit 160 and a charge instruction unit 170.

Charge/discharge upper limit value setting unit 160 sets charge power upper limit value Win and discharge power upper limit value Wout at least based on battery temperature Tb and the SOC estimate value (#SOC). When the SOC estimate value (#SOC) is decreased, discharge power upper limit value Wout is set to be gradually decreased. In contrast, when the SOC estimate value (#SOC) is increased, charge power upper limit value Win is set to be gradually decreased.

Furthermore, power storage device 10 including a secondary battery and the like has temperature dependency by which the internal resistance is raised particularly at the time of low temperature. Furthermore, it is necessary to prevent the temperature from excessively rising due to further heat generation. Accordingly, it is preferable to limit the charge/discharge power at the time of low temperature and the time of high temperature.

Figure 6:
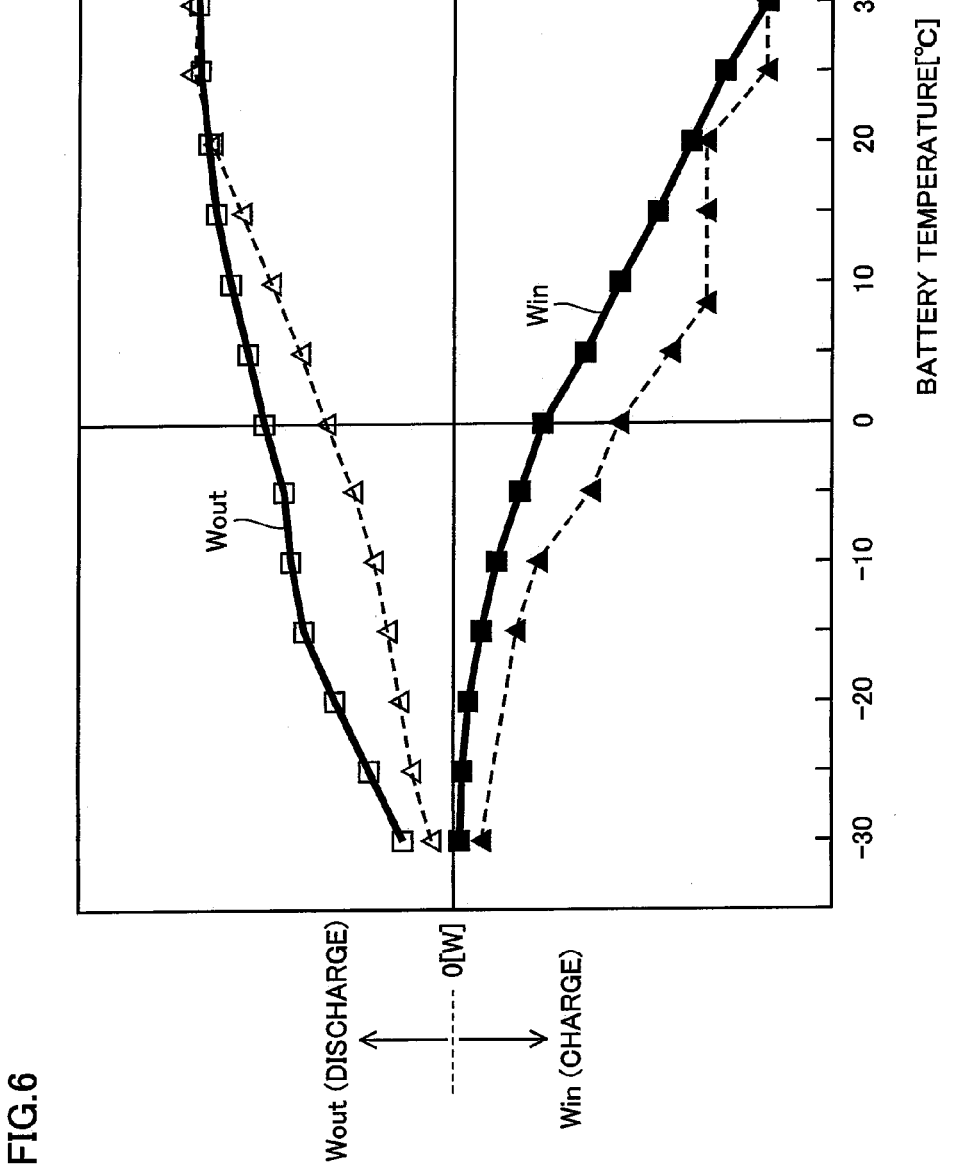
FIG. 6 is a diagram showing charge/discharge characteristics of a power storage device.

FIG. 6 is a diagram showing the charge/discharge characteristics of power storage device 10. In FIG. 6, the horizontal axis shows a battery temperature (in the unit of ° C.) while the vertical axis shows charge power upper limit value Win and discharge power upper limit value Wout (each in the unit of W (watt)). Discharge power upper limit value Wout is shown in the region above "0 [W]" on the vertical axis, while charge power upper limit value Win is shown in the region below "0 [W]" on the vertical axis. In FIG. 6, while a solid line shows charge power upper limit value Win and discharge power upper limit value Wout of a lithium-ion secondary battery, while a dashed line shows charge power upper limit value Win and discharge power upper limit value Wout of a nickel-metal hydride secondary battery.

In the case where a secondary battery is used for power storage device 10, charge power upper limit value Win and discharge power upper limit value Wout are decreased as the battery temperature is lowered. When a lithium-ion secondary battery is used (see the solid line in FIG. 6), discharge power upper limit value Wout increases while charge power upper limit value Win decreases, as compared with the case where a nickel-metal hydride secondary battery is used (see the dashed line in FIG. 6). Particularly, when the battery temperature is extremely low (for example, lower than −10° C.), charge power upper limit value Win reaches an excessively small value. In other words, when the battery temperature is extremely low, the charge power for power storage device 10 is to be limited to an excessively small value.

When the SOC estimate value (#SOC) falls below the predetermined SOC control range, in other words, the SOC estimate value (#SOC) falls below the lower limit value of the SOC control range, charge instruction unit 170 instructs that power storage device 10 should be forcibly charged. It is to be noted that the SOC control range is set to have a control width each on the upper limit side and the lower limit side with respect to the control center value. In the following description, the lower limit of the SOC control range will be referred to as a control lower limit value and the upper limit of the SOC control range will be referred to as a control upper limit value.

When the SOC estimate value (#SOC) falls below the control lower limit value, charge instruction unit 170 sets the forced charge implementation flag to be ON. Furthermore, charge instruction unit 170 sets the charge power command value such that Pch>0. In the case where Pch>0, the operation of engine 18 is requested. If engine 18 is being stopped, engine 18 is started. Then, charge power command value Pch is added to the engine output request. Furthermore, when engine 18 is operated without substantially outputting torque, engine 18 is switched to operate in the manner in which torque is output. In the following description, the operation in which torque is not substantially output will be referred to as a "no-load operation" while the operation in which torque is output will be referred to as a "load operation."

During the no-load operation, control device 100 brings engine 18 into an idle state. Specifically, control device 100 performs feedback control of the throttle opening angle such that the engine rotation speed is maintained at the predetermined target idling rotation speed. In contrast, during the load operation, control device 100 controls the throttle opening angle in accordance with the engine requested power that should be output from engine 18, such that engine 18 is controlled to output the energy greater than that in the idle state. In this case, when the actual engine power exceeds the vehicle requested power that should be output from hybrid vehicle 5, control device 100 uses motor generator MG1 to convert the portion of the actual engine power that exceeds the vehicle requested power (excessive power) into electric power which is then supplied to power storage device 10. Accordingly, power storage device 10 can be charged during the "load operation".

In contrast, when the SOC estimate value (#SOC) is not decreased, charge instruction unit 170 sets the charge power command value such that Pch=0. In this case, engine 18 is not operated for the purpose of charging power storage device 10. Furthermore, when the SOC estimate value (#SOC) is greater than the control center value and smaller than the control upper limit value, Pch is set to be closer to the discharge side, so that discharge of power storage device 10 is designated.

Thus, the present state value of power storage device 10 is reflected to set the SOC estimate and charge/discharge power upper limit values Win/Wout based thereon. Furthermore, the forced charge implementation flag is set based on the SOC estimate value.

However, when the battery temperature is extremely low as described in FIG. 6, charge power upper limit value Win of power storage device 10 is limited to an excessively small value. Accordingly, even if engine 18 is operated in order to perform forced charging of power storage device 10, the charge power to power storage device 10 is limited. Consequently, power storage device 10 may be hardly charged. In this situation, it becomes necessary to continuously operate engine 18 for a relatively long period of time until the SOC estimate value (#SOC) of power storage device 10 reaches the forced charge termination threshold value. This may cause a decrease in energy efficiency (fuel efficiency). Furthermore, when engine 18 continues to operate for relatively a long period of time, the driving sound of engine 18 may be perceived as noise by the driver while hybrid vehicle 5 is being stopped. This may cause the driver discomfort.

Therefore, in the electrically powered vehicle according to the present first embodiment, the forced charging control for power storage device 10 is switched as described below between the time period of the normal operation and the time period in which charge power upper limit value Win is limited.

Setting of the forced charge implementation flag by charge instruction unit 170 will be hereinafter described in detail with reference to FIG. 7.

Referring to FIG. 7(a), the SOC control range is set to have a control width each on the upper limit side and the lower limit side with respect to the control center value (not shown). As described above, charging and discharging of power storage device 10 are controlled such that the SOC estimate value (#SOC) is maintained between a control upper limit value Su and a control lower limit value S1.

For the SOC of power storage device 10, a management upper limit value 5 min and a management lower limit value Smax are further set. Management upper limit value Smax and management lower limit value Smin correspond to charge/discharge limit values under specifications that may cause a rapid deterioration when overcharge or overdischarge further progresses. Therefore, the SOC control range should be set to fall within the range between management lower limit value Smin and management upper limit value Smax.

As described above, charge instruction unit 170 sets the forced charge implementation flag to be ON when the SOC estimate value (#SOC) falls below control lower limit value S1, that is, the condition of #SOC<S1 is established. Furthermore, charge instruction unit 170 sets the charge power command value such that Pch>0. In the case where Pch>0, the operation of engine 18 is requested. As described above, if engine 18 is being stopped, engine 18 is started. Furthermore, if engine 18 is operated in the no-load operation state, engine 18 is brought into the load operation state. Charge power command value Pch is added to the engine output request.

Then, when power storage device 10 is forcibly charged and the SOC estimate value (#SOC) reaches a forced charge termination threshold value S2, charge instruction unit 170 sets the forced charge implementation flag to be OFF. When the forced charge implementation flag is set to be OFF, the operation state of engine 18 is controlled to be switched to the stopped state. This leads to termination of forced charging of power storage device 10. In other words, forced charge termination threshold value S2 corresponds to a threshold value for determining whether forced charging of power storage device 10 is to be terminated or not. It is to be noted that forced charge termination threshold value S2 is set such that discharge power upper limit value Wout of power storage device 10 at the end of forced charging exceeds the output power from power storage device 10 which is required for starting engine 18 or restarting engine 18 after engine 18 is stopped.

When the temperature of power storage device 10 is relatively low in which case charge power upper limit value Win is limited, charge instruction unit 170 causes forced charge termination threshold value S2 in the case of the normal operation (at the time when power storage device 10 is at a room temperature) shown in FIG. 7(a) to be decreased to a forced charge termination threshold value S3 shown in FIG. 7(b). Forced charge termination threshold value S3 is increased by an amount which is predetermined with respect to control lower limit value S1, so as to prevent occurrence of a hunting phenomenon in which execution/termination of forced charging, that is, activation/deactivation of engine 18, is repeated in accordance with an increase and a decrease in the SOC estimate value (#SOC).

When comparing FIG. 7(a) with FIG. 7(b), at the time when the temperature of power storage device 10 is low, forced charging is terminated when the SOC estimate value (#SOC) reaches forced charge termination threshold value S3 that is smaller than forced charge termination threshold value S2 at the time of room temperature. Accordingly, at the time when the temperature of power storage device 10 is low, lengthening of the charging time for power storage device 10 can be suppressed as compared with the case of the room temperature. As a result, at the time of low temperature in which the charge power that can be received by power storage device 10 is limited, engine 18 continues to operate for a relatively long period of time, which can prevent deterioration of the energy efficiency (fuel efficiency).

As described above, when charge power upper limit value Win is limited (at the time of low temperature), the forced charge termination threshold value is decreased below that in case of the normal operation (at the time of room temperature), which causes power storage device 10 to remain in a low SOC state even after termination of forced charging. This raises a concern that the electric power that can be output from power storage device 10 may be decreased. However, when power storage device 10 is in a low SOC state, the output power of power storage device 10 is limited while the charge power that can be received by power storage device 10 is increased. Accordingly, the SOC of power storage device 10 can be efficiently increased as compared with the case where forced charging of power storage device 10 is continued under the limitation of charge power upper limit value Win.

Figure 7:
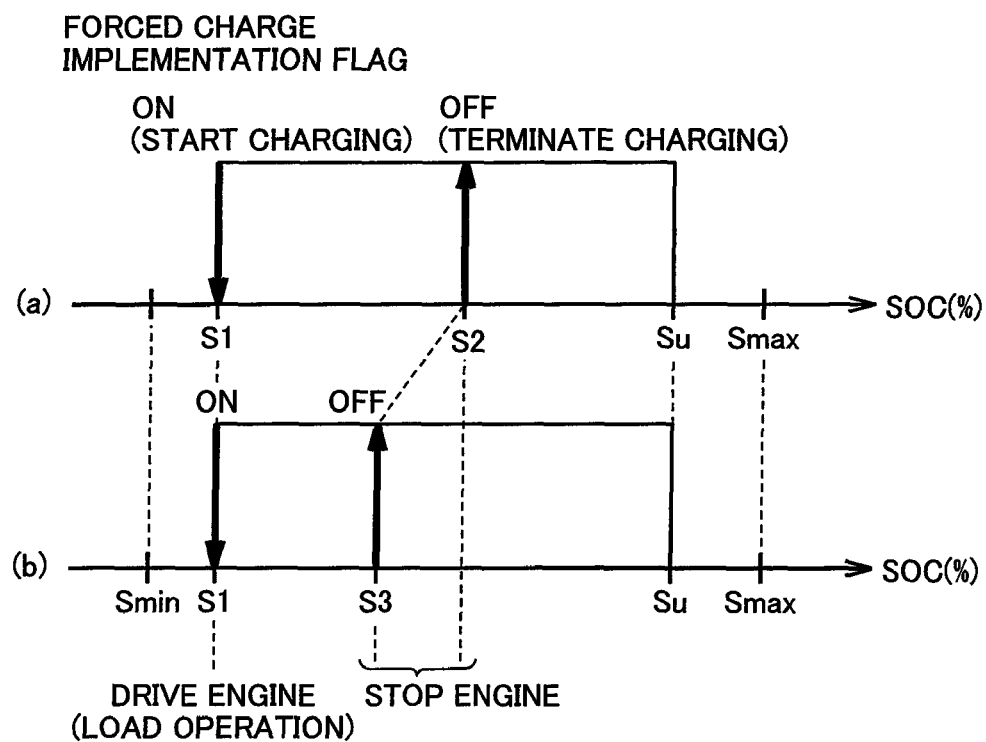
FIG. 7 is a conceptual diagram illustrating the setting of a forced charge implementation flag by a charge instruction unit shown in FIG. 6.

In addition, forced charge termination threshold value S3 (FIG. 7 (b)) at the time when charge power upper limit value Win is limited (at the time of low temperature) is not limited to the above-described example as long as forced charge termination threshold value S3 can be set to be decreased as the charge power that can be received by power storage device 10 is decreased. For example, forced charge termination threshold value S3 can be set at a value that can vary depending on charge power upper limit value Win. In this case, if forced charge termination threshold value S3 is set to be decreased as charge power upper limit value Win is decreased, deterioration of the energy efficiency can be effectively avoided. In this case, forced charge termination threshold value S3 may be set to be decreased as battery temperature Tb is lowered.

Alternatively, the charging time for forcibly charging power storage device 10 at the time of the normal operation (at the time of room temperature) may be set as a default value, while the charging time for power storage device 10 may be set to be shorter than this default value at the time when charge power upper limit value Win is limited (at the time of low temperature). In this case, the charging time may be set at a value that can vary depending on charge power upper limit value Win. For example, if it is configured such that the charging time is set to be shortened as battery temperature Tb is lowered, deterioration of the energy efficiency can be effectively avoided.

Then, the forced charging of power storage device 10 carried out by control device 100 will be described.

Figure 8:
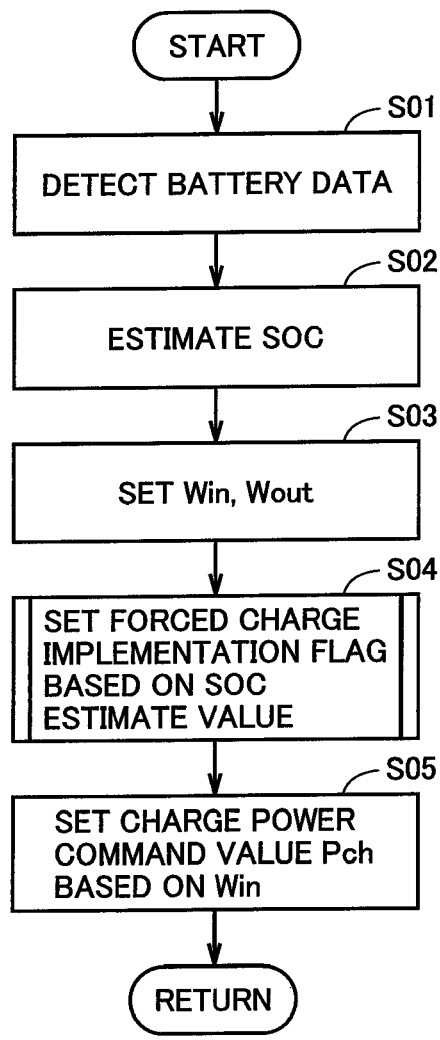
FIG. 8 is a flowchart showing the control processing procedure for implementing forced charging of the power storage device according to the present first embodiment.

FIG. 8 is a flowchart showing the control processing procedure for implementing the forced charging of power storage device 10 according to the present first embodiment.

Referring to FIG. 8, control device 100 acquires battery data (Tb, Ib, Vb) from monitoring unit 11 in step S01. Control device 100 then estimates an SOC of power storage device 10 in step S02. In other words, the process in step S02 corresponds to the function of state estimation unit 110 shown in FIG. 4.

In step S03, control device 100 sets charge power upper limit value Win and discharge power upper limit value Wout for power storage device 10 based on the SOC estimate value (#SOC) calculated in step S02 and battery temperature Tb. The process in step S03 corresponds to the function of charge/discharge upper limit value setting unit 160 in FIG. 5. In other words, charge power upper limit value Win and discharge power upper limit value Wout are set in the same manner as with charge/discharge upper limit value setting unit 160 in FIG. 5.

In step S04, control device 100 determines whether power storage device 10 should be charged or not based on the SOC estimate value (#SOC) calculated in step S02. When the SOC estimate value (#SOC) is lower than control lower limit value S1 (FIGS. 7(a) and (b)), control device 100 sets the forced charge implementation flag to be ON. Furthermore, when the SOC estimate value (#SOC) reaches forced charge termination threshold value S2 (FIG. 7(a)) or forced charge termination threshold value S3 (FIG. 7(b)) by the forced charging of power storage device 10, control device 100 sets the forced charge implementation flag to be OFF. The process in step S04 corresponds to the function of charge instruction unit 170 in FIG. 5.

Figure 9:
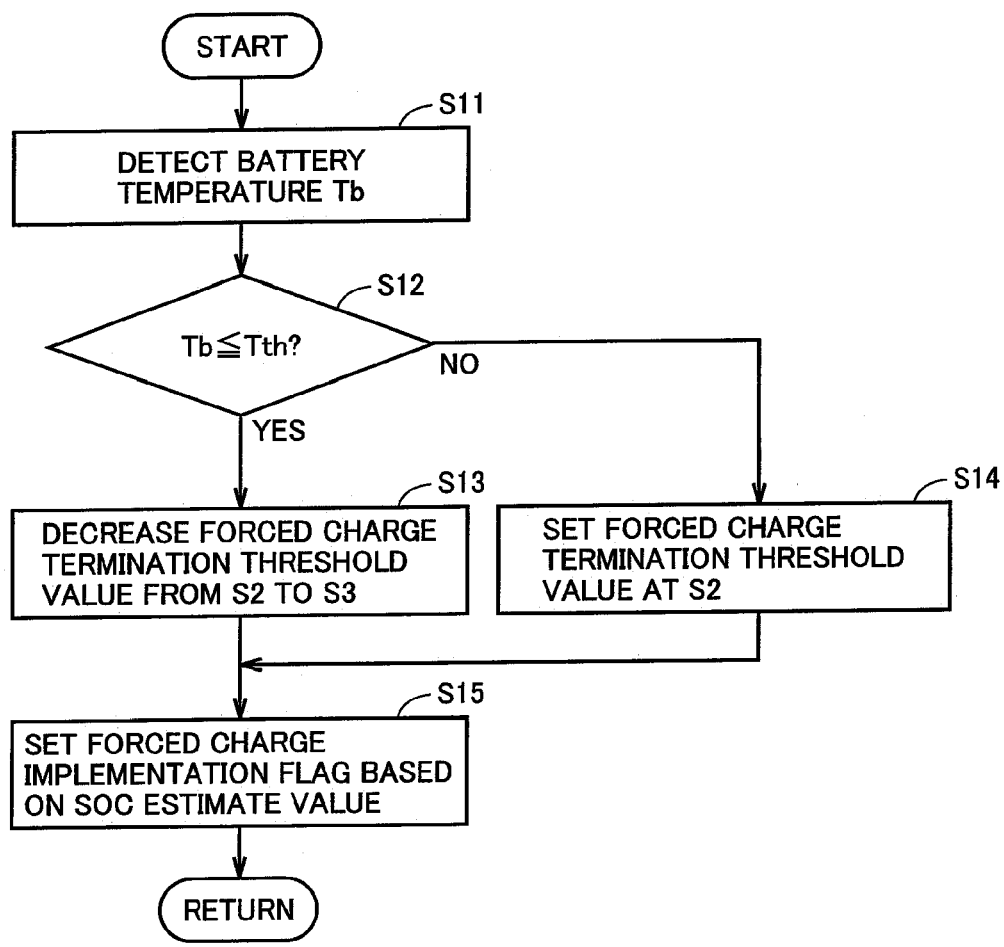
FIG. 9 is a flowchart illustrating the process in step S04 in FIG. 8 in greater detail.

FIG. 9 is a flowchart illustrating the process in step SO4 in FIG. 8 in greater detail.

Referring to FIG. 9, control device 100 acquires battery temperature Tb from monitoring unit 11 in step S11.

Control device 100 compares battery temperature Tb and a prescribed temperature Tth in step S12. Then, when battery temperature Tb is higher than prescribed temperature Tth (determined as NO in S12), control device 100 sets the forced charge termination threshold value at S2 (FIG. 7(a)) in step S14. On the other hand, when battery temperature Tb is equal to or less than prescribed temperature Tth (determined as YES in S12), control device 100 decreases the forced charge termination threshold value from S2 to S3 (<S2) in step S13.

In other words, prescribed temperature Tth is a threshold value for distinguishing whether charge power upper limit value Win is limited or not. In the case where power storage device 10 is at a room temperature (Tb>Tth), the forced charge termination threshold value is set at S2. On the other hand, in the case where the temperature of power storage device 10 is low (Tb≦Tth), the forced charge termination threshold value is set at S3 which is smaller than S2. Consequently, when power storage device 10 is in a low temperature state, that is, the charge power that can be received by power storage device 10 is limited, lengthening of the forced charging time can be suppressed as compared with the case where power storage device 10 is at a room temperature.

Then, in step S15, control device 100 sets the forced charge implementation flag based on the forced charge termination threshold value set in steps S13 and S14, and on the SOC estimate value (#SOC) calculated in step S02.

Referring back to FIG. 8, in step S05, control device 100 sets charge power command value Pch based on the forced charge implementation flag set in step S15 and on charge power upper limit value Win set in step S03. Specifically, control device 100 sets the charge power command value such that Pch>0 when the forced charge implementation flag is ON. On the other hand, when the forced charge implementation flag is OFF, control device 100 sets the charge power command value such that Pch=0. The process in step S05 corresponds to the function of charge instruction unit 170 in FIG. 5.

Thus, according to the forced charging control for the power storage device according to the first embodiment, when the charge power that can be received by power storage device 10 is limited, the charge termination condition is set so as to shorten the charging time for power storage device 10. This causes engine 18 to continue to operate for a relatively long period of time, so that deterioration of the energy efficiency (fuel efficiency) can be avoided.

(Modification)

Figure 10:
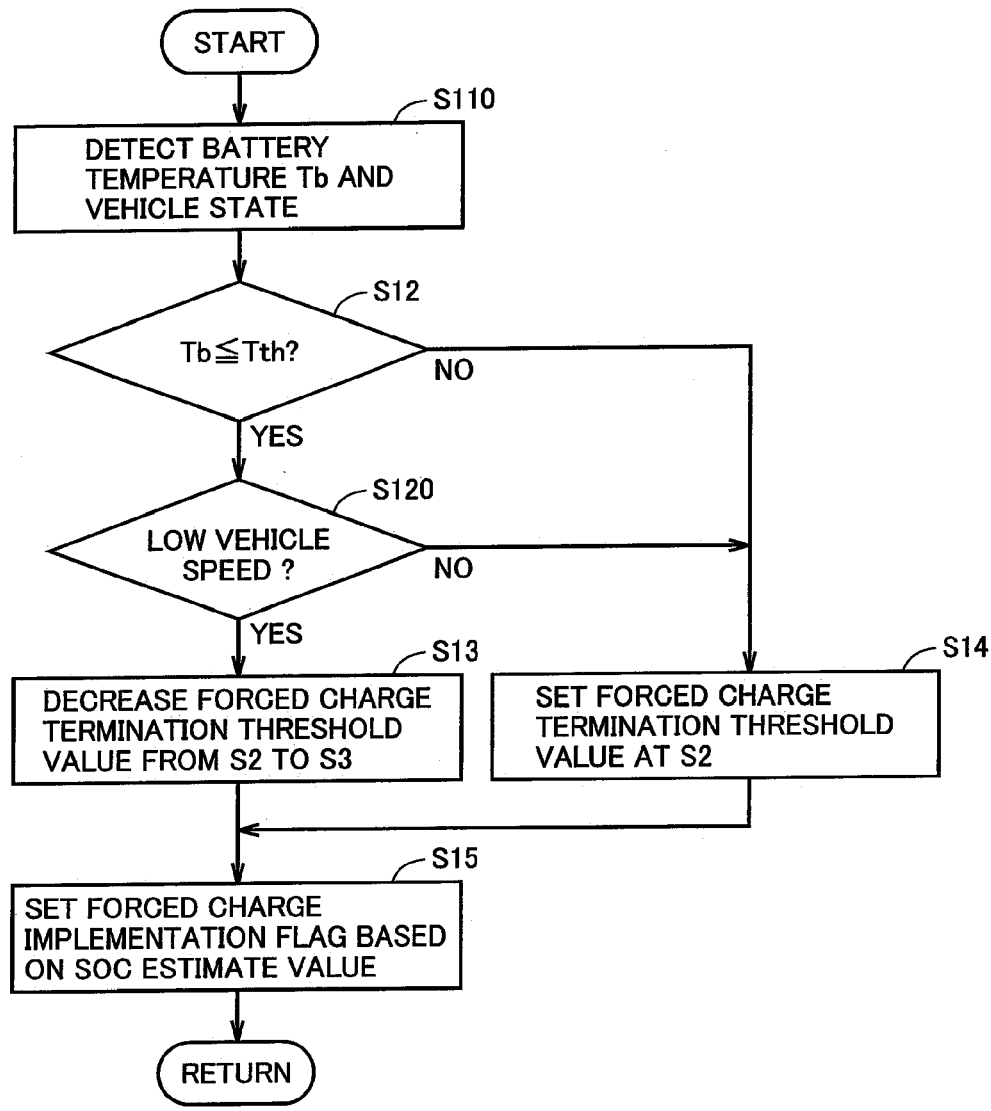
FIG. 10 is a flowchart illustrating a modification of the process in step S04 in FIG. 8.

FIG. 10 is a flowchart illustrating a modification of the process in step SO4 in FIG. 8.

Referring to FIG. 10, control device 100 acquires battery temperature Tb from monitoring unit 11 in step S110. Furthermore, control device 100 acquires the vehicle state of hybrid vehicle 5. The vehicle state includes a vehicle speed of hybrid vehicle 5.

Control device 100 compares battery temperature Tb with prescribed temperature Tth in step S12. When battery temperature Tb is higher than prescribed temperature Tth (determined as NO in S12), control device 100 sets the forced charge termination threshold value at S2 (FIG. 7 (a)) in step S14. On the other hand, when battery temperature Tb is equal to or less than prescribed temperature Tth (determined as YES in S12), control device 100 compares a vehicle speed V of hybrid vehicle 5 with a prescribed speed Vth in step S120. When vehicle speed V is higher than prescribed speed Vth (determined as NO in S120), control device 100 sets the forced charge termination threshold value at S2 (FIG. 7(a)) in step S14.

In contrast, when vehicle speed V is equal to or less than prescribed speed Vth (determined as YES in S120), control device 100 decreases the forced charge termination threshold value from S2 to S3 (<S2) in step S13.

Then, in step S15, control device 100 sets the forced charge implementation flag based on the forced charge termination threshold value set in each of steps S13 and S14 and on the SOC estimate value (#SOC) calculated in step S02.

In the present modification, prescribed speed Vth is a threshold value for distinguishing whether or not the driving sound of engine 18 is perceived as noise by the driver when power storage device 10 is charged in the case where engine 18 is operated in the state of the load operation. In the case where hybrid vehicle 5 is running at a speed within a range from medium vehicle speed to high vehicle speed (V >Vth), the noise within the vehicle chamber that is caused by vehicle running is increased. Therefore, the driving sound of engine 18 is less likely to be perceived as noise by the driver. In this case, the forced charge termination threshold value is set at S2.

On the other hand, in the case where hybrid vehicle 5 is running at a low vehicle speed or being stopped (V≦Vth), the noise within the vehicle chamber is relatively small, with the result that the driving sound of engine 18 may cause the driver discomfort as noise. In this case, the forced charge termination threshold value is set at S3 which is smaller than S2.

As described above, in the forced charging control for the power storage device according to the modification of the first embodiment, in the case where the driving sound of engine 18 may cause the driver discomfort when the charge power that can be received by power storage device 10 is limited, the charge termination condition is changed so as to shorten the charging time for power storage device 10. Consequently, deterioration of the energy efficiency can be avoided while the noise caused by engine 18 can be suppressed from causing the driver discomfort during charging of power storage device 10.

In contrast, even if the charge power that can be received by power storage device 10 is limited, when the driving sound of engine 18 cannot be easily perceived as noise by the driver, the limitations imposed on the forced charging time are eliminated. Consequently, power storage device 10 can be charged until the electric power required for starting the engine is ensured in power storage device 10.

[Second Embodiment]

In the first embodiment, forced charge termination threshold value S3 at the time when the temperature of power storage device 10 is low (FIG. 7 (b)) is set so as to prevent occurrence of the hunting phenomenon in which execution/termination of forced charging (activation/deactivation of engine 18) is repeated. In the second embodiment, the forced charging control will be explained that aims to further improve the energy efficiency of hybrid vehicle 5 while preventing occurrence of the above-described hunting phenomenon.

Figure 11:
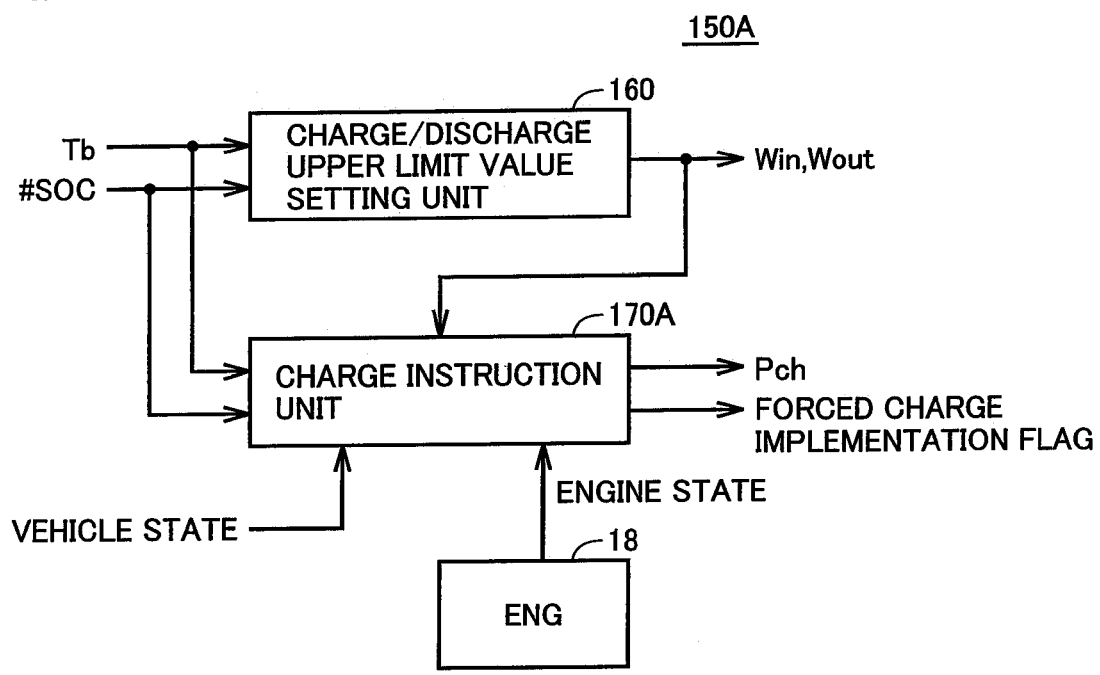
FIG. 11 is a functional block diagram illustrating the configuration of a charge/discharge control unit according to the second embodiment of the present invention.

FIG. 11 is a functional block diagram illustrating the configuration of a charge/discharge control unit 150A according to the second embodiment of the present invention.

Referring to FIG. 11, charge/discharge control unit 150A according to the present second embodiment includes a charge/discharge upper limit value setting unit 160 and a charge instruction unit 170A.

Charge/discharge upper limit value setting unit 160 sets charge power upper limit value Win and discharge power upper limit value Wout at least based on battery temperature Tb and the SOC estimate value (#SOC).

Charge instruction unit 170A sets the forced charge implementation flag to be ON when the SOC estimate value (#SOC) falls below the control lower limit value. Furthermore, charge instruction unit 170A sets the charge power command value such that Pch>0. In the case where Pch>0, the operation of engine 18 is requested. When engine 18 is being stopped, engine 18 is started. Then, charge power command value Pch is added to the engine output request. Furthermore, when engine 18 is in a no-load operation state, engine 18 is switched to be operated in a load operation state.

In contrast, when the SOC estimate value (#SOC) is not decreased, charge instruction unit 170A sets the forced charge implementation flag to be OFF and also sets the charge power command value such that Pch=0.

Setting of the forced charge implementation flag by charge instruction unit 170A will be hereinafter described in detail with reference to FIG. 12.

Figure 12:
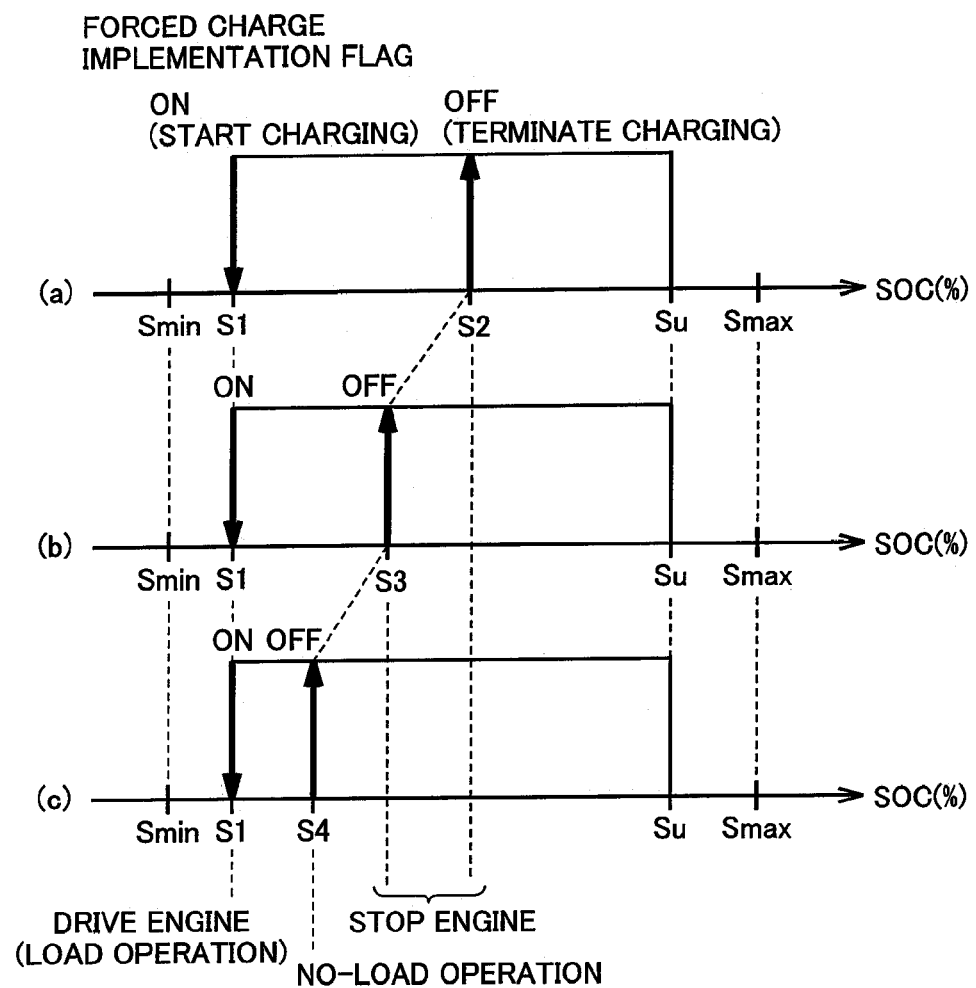
FIG. 12 is a conceptual diagram illustrating the setting of the forced charge implementation flag by the charge instruction unit shown in FIG. 11.

In FIG. 12, FIGS. 12(a) and 12(b) are identical to FIGS. 7(a) and 7(b) described above. In other words, in the normal operation of power storage device 10 (at the time when power storage device 10 is at a room temperature), as shown in FIG. 12 (a), when the SOC estimate value (#SOC) falls below control lower limit value S1, that is, #SOC <S1, charge instruction unit 170A sets the forced charge implementation flag to be ON and also sets the charge power command value such that Pch>0. Then, when the SOC estimate value (#SOC) reaches forced charge termination threshold value S2 by forcibly charging power storage device 10, charge instruction unit 170A sets the forced charge implementation flag to be OFF. When the forced charge implementation flag is set to be OFF, engine 18 in the load operation state is controlled to be in the stopped state. This leads to termination of forced charging of power storage device 10.

On the other hand, at the time when the temperature of power storage device 10 is low in which charge power upper limit value Win is limited, as shown in FIG. 12(b), the forced charge termination threshold value S2 in the normal operation (at the time when the temperature of power storage device 10 is low) is lowered to S3.

In the present second embodiment, charge instruction unit 170A further determines based on the state of engine 18 whether the intermittent operation permission condition for permitting the intermittent operation of engine 18 is satisfied or not. Then, when it is determined that the intermittent operation permission condition is not satisfied, charge instruction unit 170A causes forced charge termination threshold value S3 of power storage device 10 at low temperature to be decreased to forced charge termination threshold value S4 shown in FIG. 12(c).

In hybrid vehicle 5 equipped with engine 18 and motor generator MG2 as a driving force source, "engine intermittent operation control" is performed in which, when the prescribed engine stopping condition is satisfied, engine 18 is temporarily stopped, and furthermore, in response to the satisfaction of the engine stop canceling condition, engine 18 is restarted. In the above-described vehicle, it is necessary to ensure the quick startability of the engine at the time of restarting the engine in the case where the engine is temporarily stopped under the engine intermittent operation control.

However, if power storage device 10 cannot reliably output the electric power required for restarting the stopped engine 18, it becomes difficult to reliably start engine 18. In addition, it is also necessary to operate engine 18 in order to charge power storage device 10 while the vehicle is running.

Therefore, also during forced charging of power storage device 10, if the electric power required for starting engine 18 that is being stopped or restarting engine 18 after engine 18 under operation is stopped is not ensured in power storage device 10, it becomes difficult to perform the engine intermittent operation control. Furthermore, also in the case where the above-described the engine stopping condition or engine stop canceling condition is not satisfied, the engine intermittent operation control cannot be performed.

In the second embodiment, charge instruction unit 170A determines whether the intermittent operation permission condition is satisfied or not, to thereby determine whether the engine intermittent operation control can be carried out or not. In addition to the above-described engine stopping condition and the engine stop canceling condition, the intermittent operation permission condition includes the condition that discharge power upper limit value Wout of power storage device 10 is greater than the electric power required for starting the engine.

Then, in the case where the intermittent operation permission condition is not satisfied, that is, the engine intermittent operation control cannot be performed, when the forced charge implementation flag is set to be OFF, engine 18 in the load operation state is controlled to be in the no-load operation state. Therefore, even when the forced charging of power storage device 10 is completed, engine 18 is to continuously operate.

Furthermore, charge instruction unit 170A decreases the forced charge termination threshold value from S3 to S4 when the intermittent operation permission condition is not satisfied. This is based on the following reasons. That is, since engine 18 continues to operate even when the SOC estimate value (#SOC) of power storage device 10 reaches the forced charge termination threshold value as described above, a decrease in the forced charge termination threshold value does not cause the hunting phenomenon in which execution/termination of forced charging (activation/deactivation of the engine) is repeated.

In this way, when the intermittent operation permission condition is not satisfied, the forced charge termination threshold value can be set without having to consider prevention of the hunting phenomenon as in the case where the intermittent operation permission condition is satisfied. Accordingly, the charging time for power storage device 10 can be further shortened as compared with the case where the intermittent operation permission condition is satisfied. Consequently, deterioration of the energy efficiency by the continuous operation of engine 18 can be avoided with more reliability.

Then, forced charging of power storage device 10 carried out by control device 100 will then be described.

Figure 13:
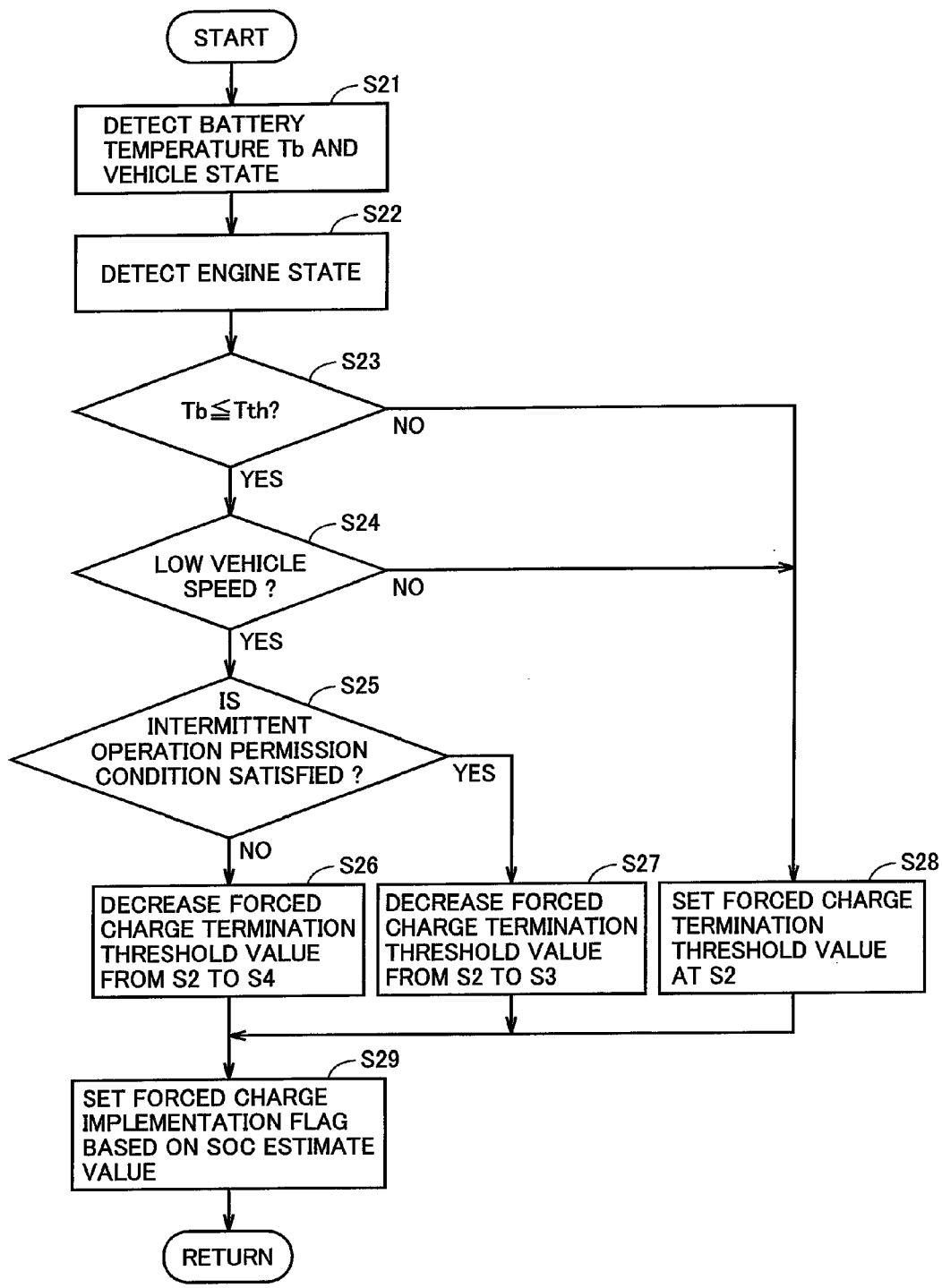
FIG. 13 is a flowchart illustrating the control processing procedure for implementing the forced charging of the power storage device according to the present second embodiment.

FIG. 13 is a flowchart illustrating the control processing procedure for implementing the forced charging of power storage device 10 according to the present second embodiment. Under control of the forced charging of power storage device 10 according to the second embodiment, step SO4 (setting of the forced charge implementation flag) in the flowchart in FIG. 8 is carried out in accordance with the flowchart in FIG. 13. Since other control operations are the same as those in the first embodiment, detailed description thereof will not be repeated.

Referring to FIG. 13, control device 100 acquires battery temperature Tb from monitoring unit 11 in step S21. Furthermore, control device 100 acquires the vehicle state of hybrid vehicle 5. The vehicle state includes vehicle speed V of hybrid vehicle 5. Control device 100 further acquires the state of engine 18 in step S22.

Control device 100 compares battery temperature Tb and prescribed temperature Tth in step S23. Then, when battery temperature Tb is higher than prescribed temperature Tth (determined as NO in S23), control device 100 sets the forced charge termination threshold value at S2 (FIG. 12(a)) in step S28. On the other hand, when battery temperature Tb is equal to or less than prescribed temperature Tth (determined as YES in S23), control device 100 compares vehicle speed V of hybrid vehicle 5 and prescribed speed Vth in step S24. When vehicle speed V is higher than prescribed speed Vth (determined as NO in S120), control device 100 sets the forced charge termination threshold value at S2 (FIG. 12 (a)) in step S28.

In contrast, when vehicle speed V is equal to or less than prescribed speed Vth (determined as YES in S24), control device 100 determines in step S25 whether the prescribed intermittent operation permission condition is satisfied or not based on the present state of engine 18. When the prescribed intermittent operation permission condition is satisfied (determined as YES in S25), control device 100 decreases the forced charge termination threshold value from S2 to S3 (FIG. 12(b)) in step S27.

On the other hand, when the prescribed intermittent operation permission condition is satisfied (determined as YES in S25), control device 100 decreases the forced charge termination threshold value from S2 to S4 (FIG. 12 (c)) in step S26.

Then, in step S29, control device 100 sets a forced charge implementation flag based on the forced charge termination threshold value set in steps S26, S27 and S28, and on the SOC estimate value (#SOC) calculated in step S02.

In the first and second embodiments, an illustration has been made with regard to the case where the battery temperature of power storage device 10 is relatively low as an example in which the electric power that can be received by power storage device 10 (charge power upper limit value Win) is limited, and an explanation has also been made with regard to the configuration in which the forced charging time is shortened as compared with the case in the normal operation when the temperature of power storage device 10 is low. However, charge power upper limit value Win varies also depending on the deterioration degree of power storage device 10 in addition to the battery temperature. Specifically, charge power upper limit value Win is decreased in accordance with the progress of deterioration of power storage device 10. The present invention can be applied not only to the case where the temperature of power storage device 10 is low, but also to the case where power storage device 10 is deteriorated. In other words, the present invention can be applied to the case where the electric power that can be received by power storage device 10 is limited.

Furthermore, although an explanation has been made in the first and second embodiments with regard to the configuration of the vehicle, as an example of an electrically powered vehicle, which is equipped with engine 18 as a driving force source and is capable of generating charge power for power storage device 10 by the output of engine 18, the present invention is not limited to be applied to such an electrically powered vehicle. Specifically, the present invention can be applied as long as a power generation mechanism for charging power storage device 10 by power generation using the output of engine 18 is equipped. Although an explanation has been made in the first and second embodiments, for example, with regard to a series/parallel type hybrid vehicle as hybrid vehicle 5 having power split device 22 that allows the motive power of engine 18 to be divided and transmitted to driving wheel 24F and motor generator MG1, the present invention can also be applied to other types of hybrid vehicle.

Figure 14:
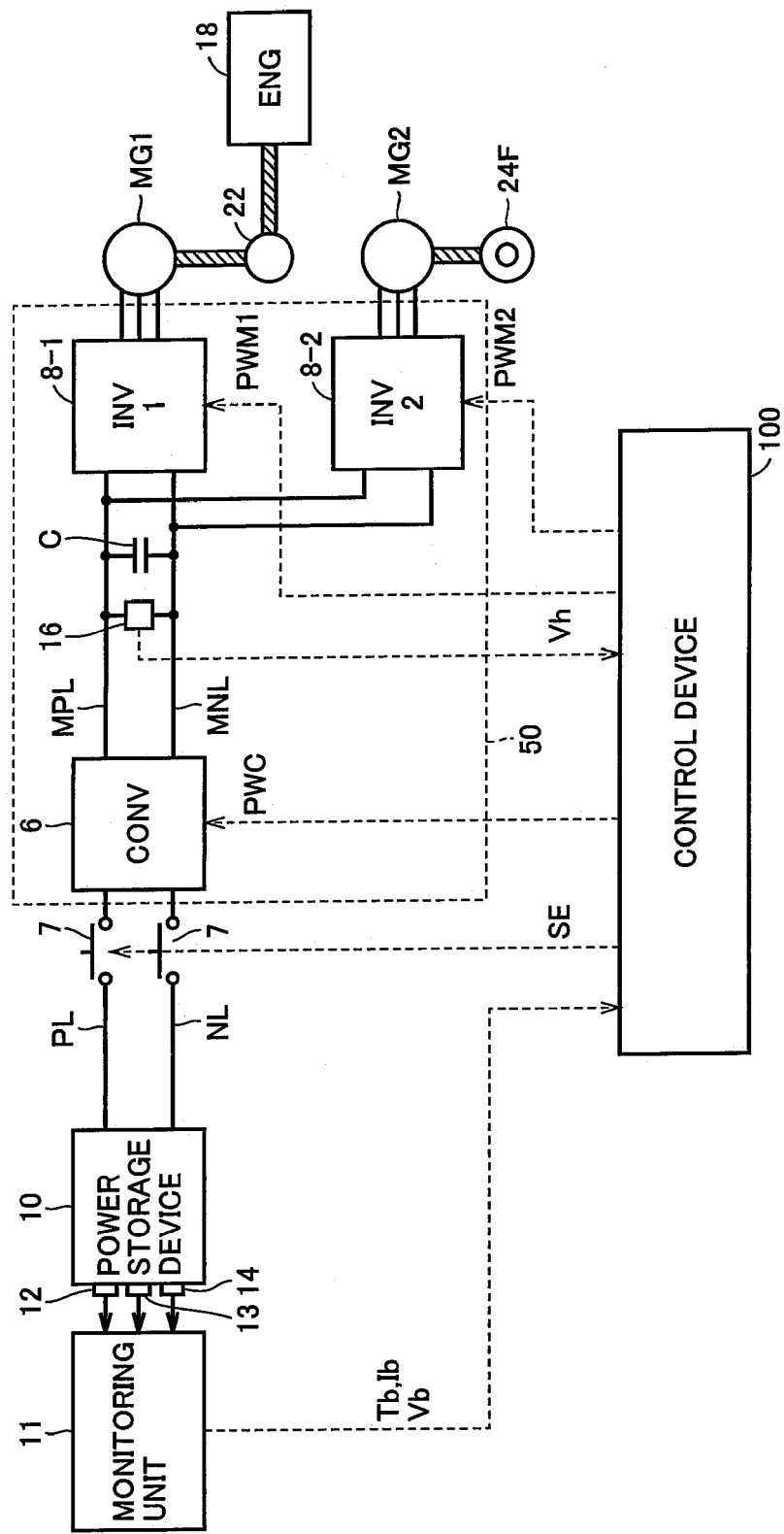
FIG. 14 is a schematic configuration diagram showing another configuration example of the hybrid vehicle to which the present invention can be applied.

By way of example, as shown in FIG. 14, the present invention can also be applied to the so-called series-type hybrid vehicle which uses engine 18 only for driving motor generator MG1 for power generation to generate driving force for a vehicle only by motor generator MG2 for driving.

Figure 15:
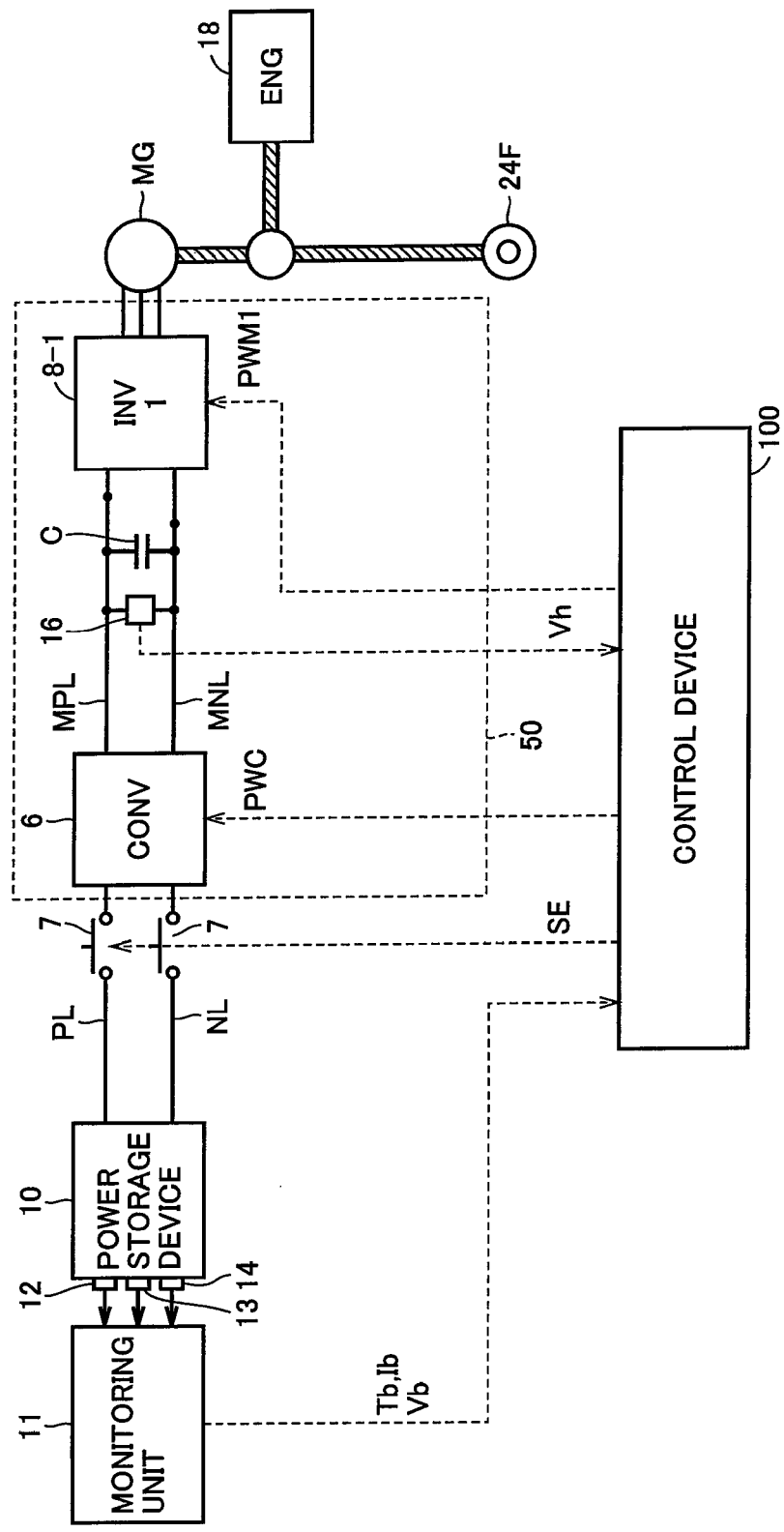
FIG. 15 is a schematic configuration diagram showing another configuration example of the hybrid vehicle to which the present invention can be applied.

Also as shown in FIG. 15, the present invention is also applicable to a motor assist type hybrid vehicle in which engine 18 is used as a main power source with the assistance of motor generator MG as appropriate. In hybrid vehicle in FIG. 15, motor generator MG is configured to collect only regenerative energy as electric energy from the kinetic energy generated by engine 18. Furthermore, motor generator MG operates as a power generator generating electric power using the output of engine 18 in the situation where no driving force is generated, so that a "power generation mechanism" in the present invention can be configured.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention can be applied to an electrically powered vehicle equipped with a vehicle-mounted power storage device and a power generation mechanism using the output of an internal combustion engine to generate electric power for charging the vehicle-mounted power storage device.

REFERENCE SIGNS LIST

5 hybrid vehicle, 6 converter, 7 system main relay, 8-1, 8-2 inverter, 10 power storage device, 11 monitoring unit, 12 temperature sensor, 13, 16 voltage sensor, 14 current sensor, 18 engine, 22 power split device, 24F driving wheel, 50 power control unit, 95 reduction gear, 100 control device, 110 state estimation unit, 150, 150A charge/discharge control unit, 160 charge/discharge upper limit value setting unit, 170, 170A charge instruction unit, 200 running control unit, 202 sun gear, 204 pinion gear, 206 carrier, 208 ring gear, 250 distribution unit, 260 inverter control unit, 270 converter control unit, C smoothing capacitor, MG1, MG2 motor generator, MNL negative bus, MPL positive bus, NL negative line, PL positive line.

The invention claimed is:

1. An electrically powered vehicle comprising:
a power storage device storing electric power for generating driving force for a vehicle;
an internal combustion engine;
a power generation mechanism for generating charge power for said power storage device by electric power generation using an output of said internal combustion engine;
a charging state estimation unit for estimating a remaining capacity of said power storage device based on a state value of said power storage device; and
a charge/discharge control unit for controlling charging and discharging of said power storage device based on a remaining capacity estimate value obtained by said charging state estimation unit,
said charge/discharge control unit including
a charge instruction unit for, in a case where said remaining capacity estimate value falls below a predetermined lower limit value, controlling said internal combustion engine to be in a load operation state to generate said charge power and controlling said internal combustion engine to be in a no-load operation state or in a stopped state when it is determined that a prescribed charge termination condition is satisfied, and
said charge instruction unit setting said charge termination condition such that a charging time for said power storage device is shortened as the charge power that can be received by said power storage device in a present state is decreased.

2. The electrically powered vehicle according to claim 1, wherein
said charge instruction unit determines that said charge termination condition is satisfied when said remaining capacity estimate value reaches a charge termination threshold value, and
said charge termination threshold value is set at a value that decreases as the charge power that can be received by said power storage device in the present state is decreased.

3. The electrically powered vehicle according to claim 2, further comprising an upper limit value setting unit for setting a charge power upper limit value of said power storage device in the present state at least based on said remaining capacity estimate value and a temperature of said power storage device, wherein
said charge termination threshold value is set at a value that decreases as said charge power upper limit value is decreased.

4. The electrically powered vehicle according to claim 3, wherein
said power storage device has a characteristic that said charge power upper limit value is decreased as the temperature of said power storage device is lowered, and
said charge instruction unit decreases said charge termination threshold value from a first value to a second value when a first condition is satisfied that the temperature of said power storage device is lower than a prescribed temperature.

5. The electrically powered vehicle according to claim 4, wherein said charge instruction unit decreases said charge termination threshold value from said first value to said second value when a vehicle speed of said electrically powered vehicle is lower than a prescribed speed in a case where said first condition is satisfied.

6. The electrically powered vehicle according to claim 1, wherein
said charge instruction unit determines that said charge termination condition is satisfied when a prescribed time has elapsed since start of charging of said power storage device, and
said prescribed time is set at a value that decreases as a charge power upper limit value of said power storage device in the present state is decreased.

7. The electrically powered vehicle according to claim 6, wherein
said power storage device has a characteristic that said charge power upper limit value is decreased as a temperature of said power storage device is lowered, and
said charge instruction unit decreases said prescribed time from a first value to a second value when a first condition is satisfied that the temperature of said power storage device is lower than a prescribed temperature.

8. The electrically powered vehicle according to claim 7, wherein said charge instruction unit decreases said prescribed time from said first value to said second value when a vehicle speed of said electrically powered vehicle is lower than a prescribed speed in a case where said first condition is satisfied.

9. The electrically powered vehicle according to claim 1, wherein when it is determined that a predetermined intermittent operation permission condition for permitting an intermittent operation of said internal combustion engine is not satisfied, said charge instruction unit changes said charge termination condition such that the charging time for said power storage device is shortened as compared with a case where said intermittent operation permission condition is satisfied.

10. The electrically powered vehicle according to claim 9, wherein
said charge instruction unit determines that said charge termination condition is satisfied when said remaining capacity estimate value reaches a charge termination threshold value,
said power storage device has a characteristic that a charge power upper limit value is decreased as a temperature of said power storage device is lowered, and
in a case where a first condition is satisfied that the temperature of said power storage device is lower than a prescribed temperature, said charge instruction unit decreases said charge termination threshold value from a first value to a second value when said intermittent operation permission condition is satisfied, and decreases said charge termination threshold value from said first value to a third value which is smaller than said second value when said intermittent operation permission condition is not satisfied.

11. The electrically powered vehicle according to claim 10, wherein said charge instruction unit determines that said intermittent operation permission condition is satisfied at least based on a fact that a discharge power upper limit value of said power storage device in the present state is equal to or greater than consumption electric power required for starting said internal combustion engine in the stopped state.

12. The electrically powered vehicle according to claim 1, wherein
said power generation mechanism includes a first electric motor configured to generate said charge power by electric power generation using the output of said internal combustion engine, and
said electrically powered vehicle further comprising
a second electric motor configured to be capable of receiving the electric power from said power storage device to output motive power to a drive shaft, and
a power split device for dividing the motive power of said internal combustion engine into said drive shaft and a rotation shaft of said first electric motor.

13. The electrically powered vehicle according to claim 1, wherein
said power generation mechanism includes a power generator configured to generate said charge power by electric power generation using the output of said internal combustion engine, and
said electrically powered vehicle further comprising
an electric motor configured to receive the electric power from said power storage device to generate the driving force for said vehicle.

14. The electrically powered vehicle according to claim 1, further comprising a motor generator configured to receive the electric power from said power storage device to generate the driving force for said vehicle, wherein
said motor generator operates as a power generator using the output of said internal combustion engine to generate electric power in a state where the driving force for said vehicle is not generated, to thereby implement said power generation mechanism.

15. A method of controlling an electrically powered vehicle, said electrically powered vehicle including a power storage device storing electric power for generating driving force for a vehicle, an internal combustion engine, and a power generation mechanism for generating charge power for said power storage device by electric power generation using an output of said internal combustion engine, said controlling method comprising the steps of:
estimating a remaining capacity of said power storage device based on a state value of said power storage device; and
controlling charging and discharging of said power storage device based on a remaining capacity estimate value obtained by said estimating step, and
said controlling step including the steps of:
in a case where said remaining capacity estimate value falls below a predetermined lower limit value, controlling said internal combustion engine to be in a load operation state to generate said charge power, and controlling said internal combustion engine to be in a no-load operation state or in a stopped state when it is determined that a prescribed charge termination condition is satisfied; and
setting said charge termination condition such that a charging time for said power storage device is shortened as a charge power upper limit value that can be received by said power storage device in a present state is decreased.

\* \* \* \* \*